(12) United States Patent
Li et al.

(10) Patent No.: US 8,593,198 B2
(45) Date of Patent: Nov. 26, 2013

(54) SIGNAL GENERATOR AND SIGNAL STRENGTH DETECTING CIRCUIT HAVING THE SIGNAL GENERATOR INSTALLED THEREIN

(75) Inventors: Dan Ping Li, Singapore (SG); Chun Geik Tan, Singapore (SG)

(73) Assignee: MediaTek Singapore Pte. Ltd., Singapore (SG)

( * ) Notice: Subject to any disclaimer, the term of this patent is extended or adjusted under 35 U.S.C. 154(b) by 12 days.

(21) Appl. No.: 13/103,095

(22) Filed: May 8, 2011

(65) Prior Publication Data

US 2012/0019298 A1     Jan. 26, 2012

Related U.S. Application Data

(60) Provisional application No. 61/365,888, filed on Jul. 20, 2010.

(51) Int. Cl.
*G06F 1/04*     (2006.01)

(52) U.S. Cl.
USPC ......................................................... 327/291

(58) Field of Classification Search
USPC ................................... 327/291, 293–295, 298
See application file for complete search history.

(56) References Cited

U.S. PATENT DOCUMENTS

| 6,198,349 | B1 | 3/2001 | Kanno | |
|---|---|---|---|---|
| 7,218,903 | B2 * | 5/2007 | Komatsu et al. | 455/218 |
| 7,548,115 | B1 * | 6/2009 | Liu | 330/258 |
| 2010/0033358 | A1 | 2/2010 | Sahu | |

* cited by examiner

*Primary Examiner* — Lincoln Donovan
*Assistant Examiner* — Sibin Chen
(74) *Attorney, Agent, or Firm* — Winston Hsu; Scott Margo

(57) ABSTRACT

A signal generator includes: an adjusting circuit arranged to adjust a first amplitude of an oscillating signal to generate an adjusted oscillating signal; and a resistor ladder circuit arranged to receive the adjusted oscillating signal to generate a plurality of candidate output oscillating signals having a plurality of different amplitudes respectively and output an output oscillating signal selected from the candidate output oscillating signals.

16 Claims, 5 Drawing Sheets

SIGNAL GENERATOR AND SIGNAL STRENGTH DETECTING CIRCUIT HAVING THE SIGNAL GENERATOR INSTALLED THEREIN

CROSS REFERENCE TO RELATED APPLICATIONS

This application claims the benefit of U.S. Provisional Application No. 61/365,888, which was filed on Jul. 20, 2010 and is included herein by reference.

BACKGROUND

The present invention relates to a signal generator and a signal strength detecting circuit having the signal generator installed therein, and more particularly to a detecting circuit using a test tone signal to calibrate a transfer function of the detecting circuit.

A power detector is utilized for detecting power of an input signal, e.g., a wireless signal. Conventionally, magnitude of the detected power is expressed in decibels (dBVrms or dBm). If a wide detection range of input power is required, a linear-in-dB transfer function is preferred. FIG. 1 is a diagram illustrating the transfer function of an ideal power detector with linear-in-dB transfer function, where X-axis represents the power expressed in dBm of the input signal, and Y-axis represents the output voltage level corresponding to the input signal and expressed in V. It can be seen that, ideally, the relationship between the power in dBm of the input signal and the output voltage level corresponding to the input signal is a straight line having a predetermined slope. However, normally power detector circuit can only produce approximate transfer function to a real straight line, introducing so-called log-conformance error. This log-conformance error, together with process variation, temperature drift, and circuit mismatch effect of the power detector, make the relationship between the power in dBm of the input signal and the output voltage level corresponding to the input signal deviate significantly from the ideal straight line, as shown by the dashed line 12 in FIG. 1. Consequently, the output voltage level generated by the power detector may not correspond to real input power Vpr of the input signal, but to a deviated input power Vpd. Therefore, calibration of a power detector to obtain an accurate transfer function of the power detector becomes an important issue in this field.

SUMMARY

One of the objectives of the present invention is therefore to provide a detecting circuit using a test signal to calibrate a transfer function of the detecting circuit.

According to a first embodiment, a signal generator is disclosed. The signal generator comprises an adjusting circuit and a resistor ladder circuit. The adjusting circuit is arranged to adjust a first amplitude of an oscillating signal to generate an adjusted oscillating signal. The resistor ladder circuit is arranged to receive the adjusted oscillating signal to generate a plurality of candidate output oscillating signals having a plurality of different amplitudes respectively and output an output oscillating signal selected from the candidate output oscillating signals.

According to a second embodiment, a detecting circuit is disclosed. The detecting circuit comprises a signal generator and a detector. The signal generator is arranged to generate a test signal according to an oscillating signal. The detector is arranged to detect the strength of the test signal to generate a voltage level utilized to configure a transfer function between the strength of the test signal and the voltage level, wherein the signal generator and the detector are disposed in a same chip.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
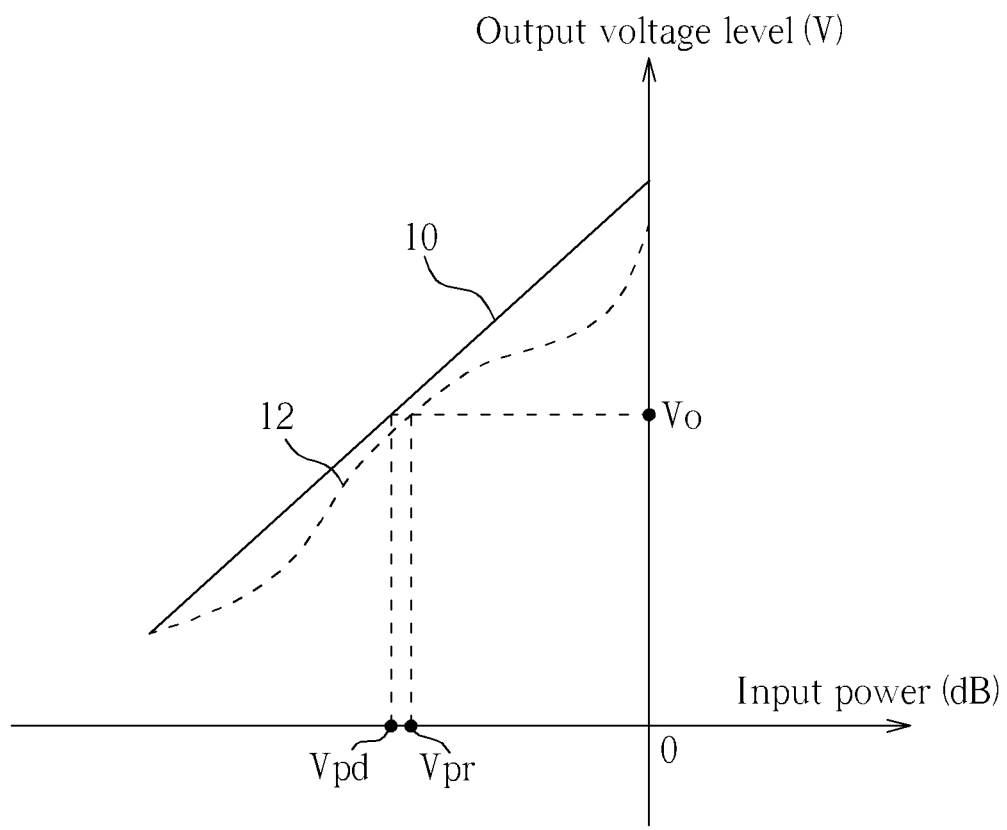
FIG. 1 is a diagram illustrating an ideal linear-in-dB transfer function of a power detector.
Figure 2:
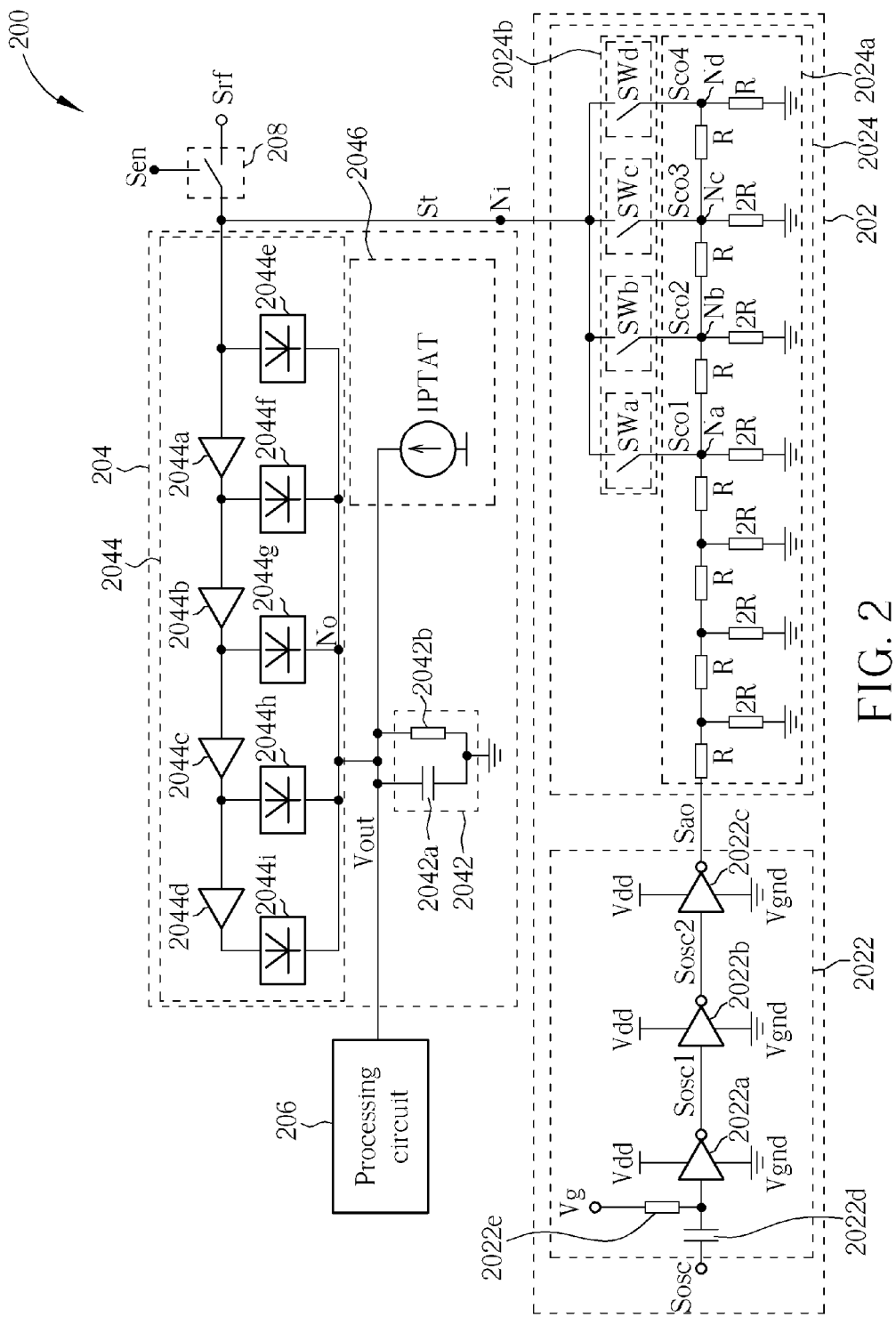
FIG. 2 is a diagram illustrating a detecting circuit according to an embodiment of the present invention.

FIG. 2 is a diagram illustrating a detecting circuit 200 according to an embodiment of the present invention. The detecting circuit 200 may be a wide-band peak/power detector (WBPD) having a signal generator for generating a test signal utilized to calibrate a transfer function of the wide-band peak/power detector. The detecting circuit 200 comprises a signal generator 202, a detector 204, and a processing circuit 206. The signal generator 202 is arranged to generate a test signal St according to an oscillating signal Sosc. The detector 204 is arranged to detect strength of the test signal St to generate a voltage level Vout utilized to configure a transfer function between the strength of the test signal St and the voltage level Vout. In this preferred embodiment, the signal generator 202 and the detector 204 are disposed in a same chip. The processing circuit 206 is arranged to determine a plurality of interception points and slopes of the transfer function according to a plurality of corresponding strengths of the candidate output oscillating signals and the corresponding voltage levels.

The signal generator 202 comprises an adjusting circuit 2022 and a resistor ladder circuit 2024. The adjusting circuit 2022 is arranged to adjust amplitude A1 of the oscillating signal Sosc to generate an adjusted oscillating signal Sao. The resistor ladder circuit 2024 is arranged to receive the adjusted oscillating signal Sao to generate a plurality of candidate output oscillating signals Sco1-Sco4 having a plurality of different amplitudes, respectively, and to output an output oscillating signal (the test signal St) selected from the candidate output oscillating signals Sco1-Sco4. It should be noted that the resistor ladder circuit 2024 arranged to generate four candidate output oscillating signals (i.e., Sco1-Sco4) is just an example, but is not a limitation, of the present invention. Furthermore, the test signal St is the test tone utilized for calibrating the transfer function of the detecting circuit 200.

In addition, the adjusting circuit 2022 comprises at least one inverter arranged to invert the oscillating signal Sosc to generate the adjusted oscillating signal Sao with rail-to-rail swing. For the example of this preferred embodiment, the adjusting circuit 2022 comprises three inverters 2022a-2022c connected in series, where each inverter is operated between a supply voltage Vdd and a ground voltage Vgnd, the first inverter 2022a has a first size corresponding to a first driving capability, the second inverter 2022b has a second size corresponding to a second driving capability, and the third inverter 2022c has a third size corresponding to a third driving capability. For example, ratio of the first size, the second size and the third size is 1:3:9. More specifically, when the oscillating signal Sosc is generated by an oscillator (not shown), the oscillating signal Sosc is inputted to the adjusting circuit 2022 via a coupling circuit comprising a capacitor 2022d and a resistor 2022e, where a terminal of the resistor 2022e is coupled to a bias voltage Vg. When the oscillating signal Sosc is coupled to the adjusting circuit 2022, the amplitude A1 of the oscillating signal Sosc is still small, thus the amplitude A1 of the oscillating signal Sosc should be amplified to have rail-to-rail swing. Then, the first inverter 2022a is arranged to invert the oscillating signal Sosc to generate a first inverted oscillating signal Sosc1 having an amplitude A2, the second inverter 2022b is arranged to invert the first inverted oscillating signal Sosc1 to generate a second inverted oscillating signal Sosc2 having an amplitude A3, and the third inverter 2022c is arranged to invert the second inverted oscillating signal Sosc2 to generate the adjusted oscillating signal Sao with an amplitude A4 representing rail-to-rail swing, in which the amplitude A2 is greater than the amplitude A1, the amplitude A3 is greater than the amplitude A2, and the amplitude A4 is greater than the amplitude A3.

Therefore, the adjusting circuit 2022 is arranged to amplify the amplitude A1 of the oscillating signal Sosc until the amplitude of the output signal (the adjusted oscillating signal Sao) of the adjusting circuit 2022 has rail-to-rail swing. For this purpose, the adjusting circuit 2022 can also be implemented by at least one amplifier to amplify the amplitude A1 of the oscillating signal Sosc to generate the adjusted oscillating signal Sao with rail-to-rail swing. More specifically, for example, the adjusting circuit 2022 may comprise a first amplifier and a second amplifier connected in series, where the first amplifier has a first gain provided to amplify the amplitude A1 of the oscillating signal Sosc to generate an amplified oscillating signal having second amplitude, the second amplifier has a second gain provided to amplify the second amplitude of the amplified oscillating signal to generate the adjusted oscillating signal Sao with rail-to-rail swing, and the first gain is different from (e.g. larger than) the second gain.

The resistor ladder circuit 2024 comprises a voltage dividing circuit 2024a and a switching circuit 2024b. The voltage dividing circuit 2024a is arranged to divide the adjusted oscillating signal Sao to generate the candidate output oscillating signals Sco1-Sco4, respectively. The switching circuit 2024b is arranged to select one of the candidate output oscillating signals Sco1-Sco4 as the test signal St. In this preferred embodiment, the voltage dividing circuit 2024a comprises a plurality of resistors each having resistance R, and a plurality of resistors each having resistance 2R. Connectivity between the above resistors is shown in FIG. 2, thus detailed description thereof is omitted here for brevity. Specifically, the voltage dividing circuit 2024a is an R-2R ladder network utilized for attenuating the square wave of the adjusted oscillating signal Sao progressively. The candidate output oscillating signals Sco1-Sco4 are generated at the four different terminals Na-Nd of the voltage dividing circuit 2024a, where the four terminals Na-Nd correspond to the lowest four square waves generated by the voltage dividing circuit 2024a, respectively.

In addition, the switching circuit 2024b comprises four switches SWa-SWd, each arranged to selectively couple the terminals Na-Nd to the input terminal Ni of the detector 204.

The detector 204 comprises a filtering circuit 2042, a converting circuit 2044, and a compensating circuit 2046. The converting circuit 2044 is coupled to the filtering circuit 2042 at a connecting node No, and the converting circuit 2044 is arranged to convert the test signal St into the voltage level Vout at the connecting node No. The compensating circuit 2046 is coupled to the connecting node No, and the compensating circuit 2046 is arranged to compensate a variation of the voltage level Vout due to a temperature variation. In this preferred embodiment, the compensating circuit 2046 is a current source having a current IPTAT injected into the connecting node No, and the current IPTAT is proportional to temperature.

The filtering circuit 2042 comprises a capacitor 2042a and a resistor 2042b, where the capacitor 2042a is arranged to connect in parallel to the resistor 2042b to form a low-pass filter. The converting circuit 2044 comprises a plurality of limiting amplifiers and a plurality of rectifiers. In this preferred embodiment, for example, the converting circuit 2044 comprises four limiting amplifiers 2044a-2044d and five rectifiers 2044e-2044i, where the limiting amplifiers 2044a-2044d are connected in series, the first rectifier 2044e is coupled between the input terminal of the first limiting amplifier 2044a and the connecting node No, the second rectifier 2044f is coupled between the output terminal of the first limiting amplifier 2044a and the connecting node No, the third rectifier 2044g is coupled between the output terminal of the second limiting amplifier 2044b and the connecting node No, the fourth rectifier 2044h is coupled between the output terminal of the third limiting amplifier 2044c and the connecting node No, and the fifth rectifier 2044i is coupled between the output terminal of the fourth limiting amplifier 2044d and the connecting node No.

Figure 3:
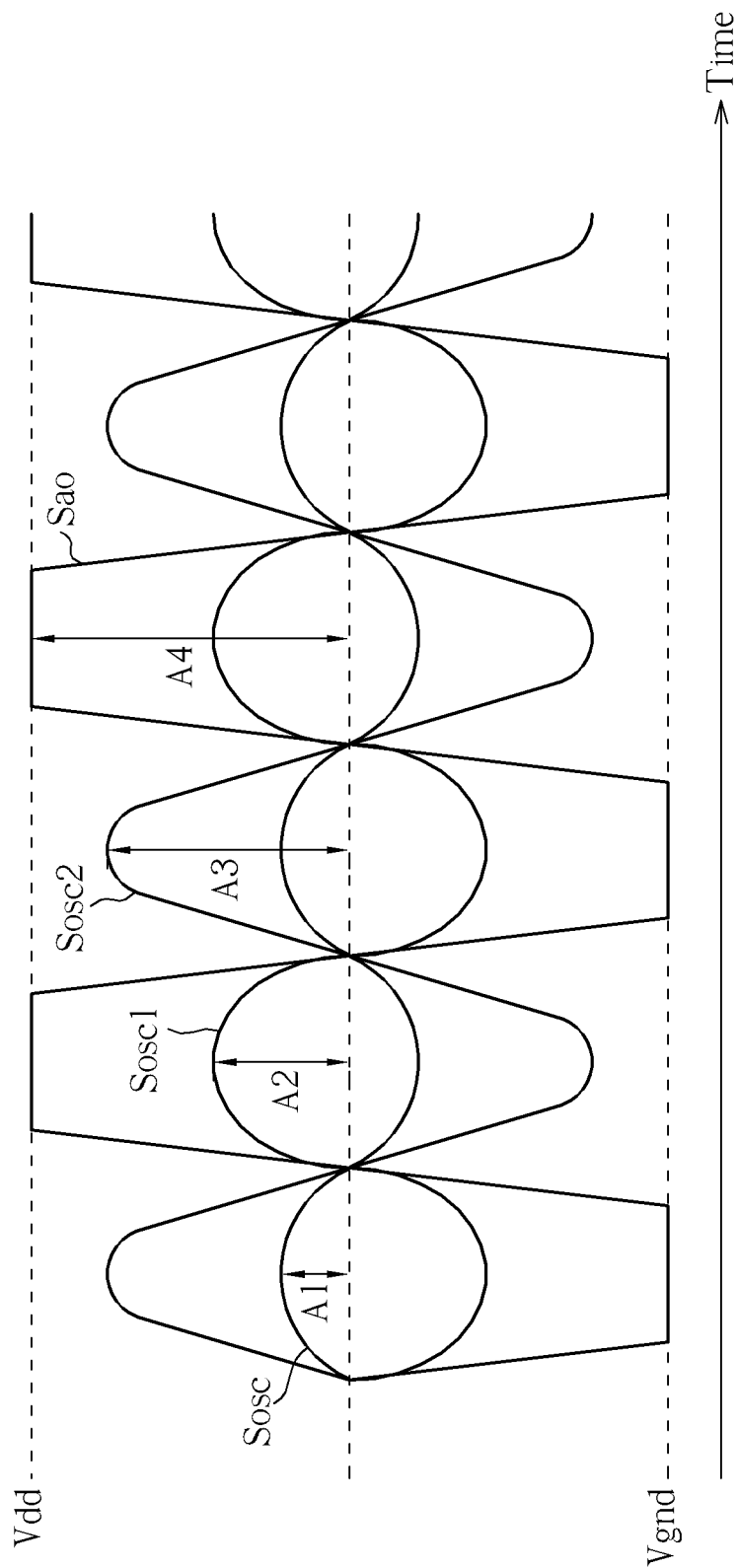
FIG. 3 is a timing diagram illustrating an oscillating signal, a first inverted oscillating signal, a second inverted oscillating signal, and an adjusted oscillating signal of the detecting circuit shown in FIG. 2 according to an embodiment of the present invention.

FIG. 3 is a timing diagram illustrating the oscillating signal Sosc, the first inverted oscillating signal Sosc1, the second inverted oscillating signal Sosc2, and the adjusted oscillating signal Sao of the detecting circuit 200 according to an embodiment of the present invention. For brevity, all of the oscillating signal Sosc, the first inverted oscillating signal Sosc1, the second inverted oscillating signal Sosc2, and the adjusted oscillating signal Sao are shown on the same time line. When the detecting circuit 200 is powered on, for example, the oscillating signal Sosc is generated, and the amplitude A1 of the oscillating signal Sosc is amplified by the first inverter 2022a to generate the first inverted oscillating signal Sosc1 having the amplitude A2. Then, the amplitude A2 of the first inverted oscillating signal Sosc1 is amplified by the second inverter 2022b to generate the second inverted oscillating signal Sosc2 having the amplitude A3. Then, the amplitude A3 of the second inverted oscillating signal Sosc2 is amplified by the third inverter 2022c to generate the adjusted oscillating signal Sao with the amplitude A4 representing rail-to-rail swing (i.e. a square wave).

It is noted that when the amplitude A4 of the adjusted oscillating signal Sao represents rail-to-rail swing, variation of the amplitude A4 over process corners and extreme hot and cold temperatures (e.g. −40° C. to 125° C.) may still be small (e.g. within 0.5 dB). This is because the supply voltage Vdd generated by a low-dropout regulator, for example, has a small variation over the process corners and the extreme hot and cold temperatures. Accordingly, a stable rail-to-rail swing oscillating signal (i.e. the adjusted oscillating signal Sao) is inputted to the resistor ladder circuit 2024.

According to the resistor arrangement of the voltage dividing circuit 2024a, the voltage dividing circuit 2024a is capable of generating a plurality of oscillating signals (i.e. square waves) via the plurality of terminals connecting the plurality of resistors, each having a resistance R or 2R, where the oscillating signals have the amplitudes different to each other. More specifically, the amplitude of each of the oscillating signals is reduced by a factor of 2 from the left connecting terminal to the right connecting terminal of the voltage dividing circuit 2024a shown in FIG. 2. In this preferred embodiment, the candidate square waves (i.e. the candidate output oscillating signals Sco1-Sco4) are generated at the four different terminals Na-Nd of the voltage dividing circuit 2024a, respectively. Therefore, the amplitudes of the candidate output oscillating signals Sco1-Sco4 are predetermined amplitudes. In other words, the respective candidate output oscillating signals Sco1-Sco4 each have predetermined power. According to the preferred embodiment, mismatch between the resistors in the voltage dividing circuit 2024a can be well-controlled by using unit resistors to make the variations of the amplitudes of the candidate output oscillating signals Sco1-Sco4 due to random mismatch also small.

Then, the switching circuit 2024b is arranged to couple the candidate output oscillating signals Sco1-Sco4 one-by-one to the input terminal Ni of the detector 204 to be the test signal St. For example, when the first candidate output oscillating signal Sco1, which has the largest power in the candidate output oscillating signals Sco1-Sco4, is first selected for input to the detector 204, the converting circuit 2044 in conjunction with the filtering circuit 2042 converts the power of the first candidate output oscillating signal Sco1 into a first voltage level Vout1, and the processing circuit 206 records the first voltage level Vout1. Then, the rest of the candidate output oscillating signals are arranged for input to the detector 204 to generate the corresponding voltage levels Vout2-Vout4 one-by-one, where the voltage levels Vout2-Vout4 are also recorded by the processing circuit 206.

Figure 4:
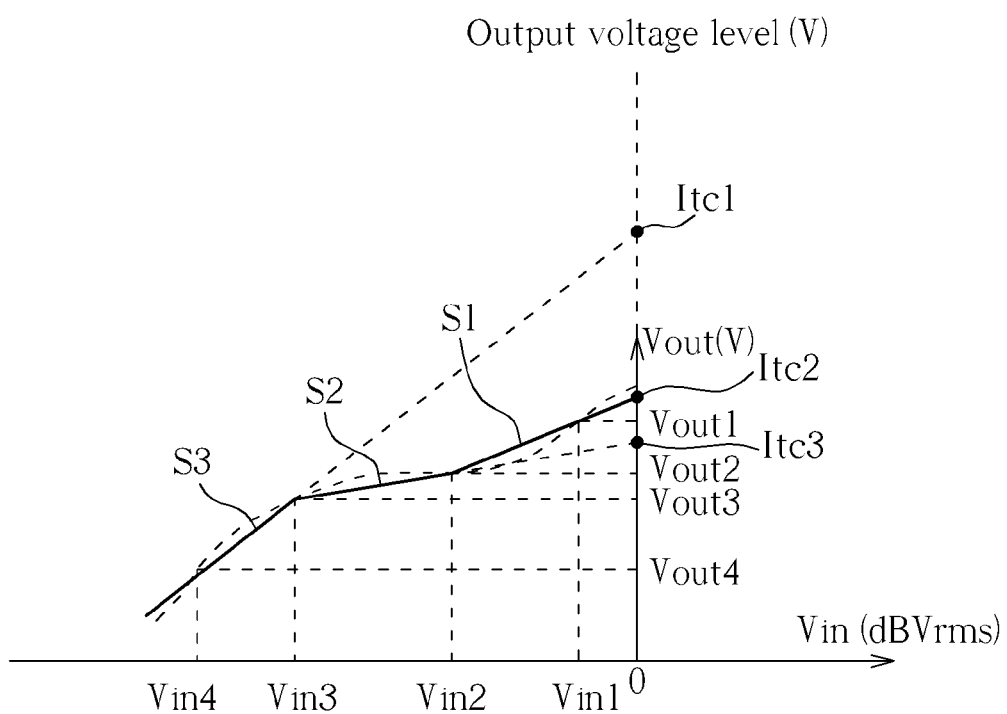
FIG. 4 is a diagram illustrating a relationship between a voltage level and an input power of a test signal of the detecting circuit shown in FIG. 2 according to an embodiment of the present invention.

FIG. 4 is a diagram illustrating the relationship between the voltage level Vout and the input power of the test signal St of the detecting circuit 200 according to an embodiment of the present invention. For brevity, the input power of the test signal St is expressed by Vin in dBVrms. As shown by the dashed curve in FIG. 4, the true relationship between the power in dBVrms (or dBm) of the input signal and the output voltage level corresponding to the input signal deviate from straight-line equation, causing log-conformance error. To alleviate this error, the transfer function of the actual detecting circuit can be fitted to multiple straight-line equations instead of one straight-line equation. In this preferred embodiment, 4-point calibration is employed to derive the piecewise linear-in-dB transfer function as shown by the solid line in FIG. 4. According to the above-mentioned operation, as the power levels Vin1-Vin4 of the four candidate output oscillating signals Sco1-Sco4 are predetermined power levels, and the corresponding four voltage levels Vout1-Vout4 are also obtained by the processing circuit 206, the processing circuit 206 can determine a plurality of interception points and slopes of the transfer function according to a plurality of corresponding strengths (i.e. the power levels Vin1-Vin4) of the candidate output oscillating signals Sco1-Sco4 and the corresponding voltage levels Vout1-Vout4. More specifically, according to the power levels Vin1-Vin4 of the candidate output oscillating signals Sco1-Sco4 and the corresponding voltage levels Vout1-Vout4, three slopes S1-S3 and three interception points Itc1-Itc3 can be obtained, where the first slope S1 and the first interception point Itc1 can be obtained by equations (1) and (2):

$$S1 = \frac{Vout2 - Vout1}{Vin2 - Vin1}, \qquad (1)$$

$$Itc1 = Vout1 - S1 * Vin1. \qquad (2)$$

The second slope S2 and the second interception point Itc2 can be obtained by equations (3) and (4):

$$S2 = \frac{Vout3 - Vout2}{Vin3 - Vin2}, \qquad (3)$$

$$Itc2 = Vout2 - S2 * Vin2. \qquad (4)$$

The third slope S3 and the third interception point Itc3 can be obtained by equations (5) and (6):

$$S3 = \frac{Vout4 - Vout3}{Vin4 - Vin3}, \qquad (5)$$

$$Itc3 = Vout3 - S3 * Vin3. \qquad (6)$$

Once the slopes S1-S3 and the interception points Itc1-Itc3 are found by the processing circuit 206, the transfer function between the strength of the test signal St and the voltage level Vout is determined. Accordingly, for Vin≥Vin2, the voltage level Vout can be expressed by the equation (7):

$$Vout = S1 * Vin + Itc1. \qquad (7)$$

For Vin3≤Vin≤Vin2, the voltage level Vout can be expressed by the equation (8):

$$Vout = S2 * Vin + Itc2. \qquad (8)$$

For Vin≤Vin3, the voltage level Vout can be expressed by the equation (9):

$$Vout = S3 * Vin + Itc3. \qquad (9)$$

Accordingly, when an output voltage is outputted at the connecting node No, the processing circuit 206 may calculate the corresponding inputted power of the signal inputted to the detector 204 according to equations (1)-(9). Therefore, the detecting circuit 200 may further comprise a switch 208 arranged to selectively couple a radio frequency (RF) signal Srf to the input terminal Ni of the detector 204 according to an enable signal Sen. More specifically, when the detector 204 is operated in calibration mode for obtaining the transfer function, the switch 208 is arranged to not couple the RF signal Srf to the input terminal Ni of the detector 204, and when the detector 204 is operated normally for detecting the input power of the RF signal Srf, the switch 208 is arranged to couple the RF signal Srf to the input terminal Ni of the detector 204.

Therefore, by injecting a plurality of test tone signals at the predetermined power levels to the detector 204 to obtain the relationship between the voltage level Vout and the input power of the test signal St of the detecting circuit 200, the transfer function of the detector 204 is calibrated to a real transfer function. In other words, the real transfer function obtained by the embodiment includes the factors of process variation, temperature drift, and circuit mismatch effect of the detector 204.

Furthermore, it should be noted that the RF signal Srf is normally a sine-wave signal, but the test tone signals utilized for generating the transfer function are square wave signals, thus the relationship between the voltage level Vout and the input power of the RF signal Srf of the detecting circuit 200 may need to be slightly adjusted. More specifically, normally, the power of a sine-wave signal at an amplitude is always lower than the power of a square-wave signal having the same amplitude by a predetermined power difference, therefore the processing circuit 206 may further adjust the detected input power Vin of the RF signal Srf by the predetermined power difference when the processing circuit 206 uses the above-mentioned real transfer function to obtain the inputted power. For example, if the predetermined power difference is A, and the detected input power Vin of the RF signal Srf using the above-mentioned real transfer function is B, then the real input power of the RF signal Srf may be B-A.

Figure 5:
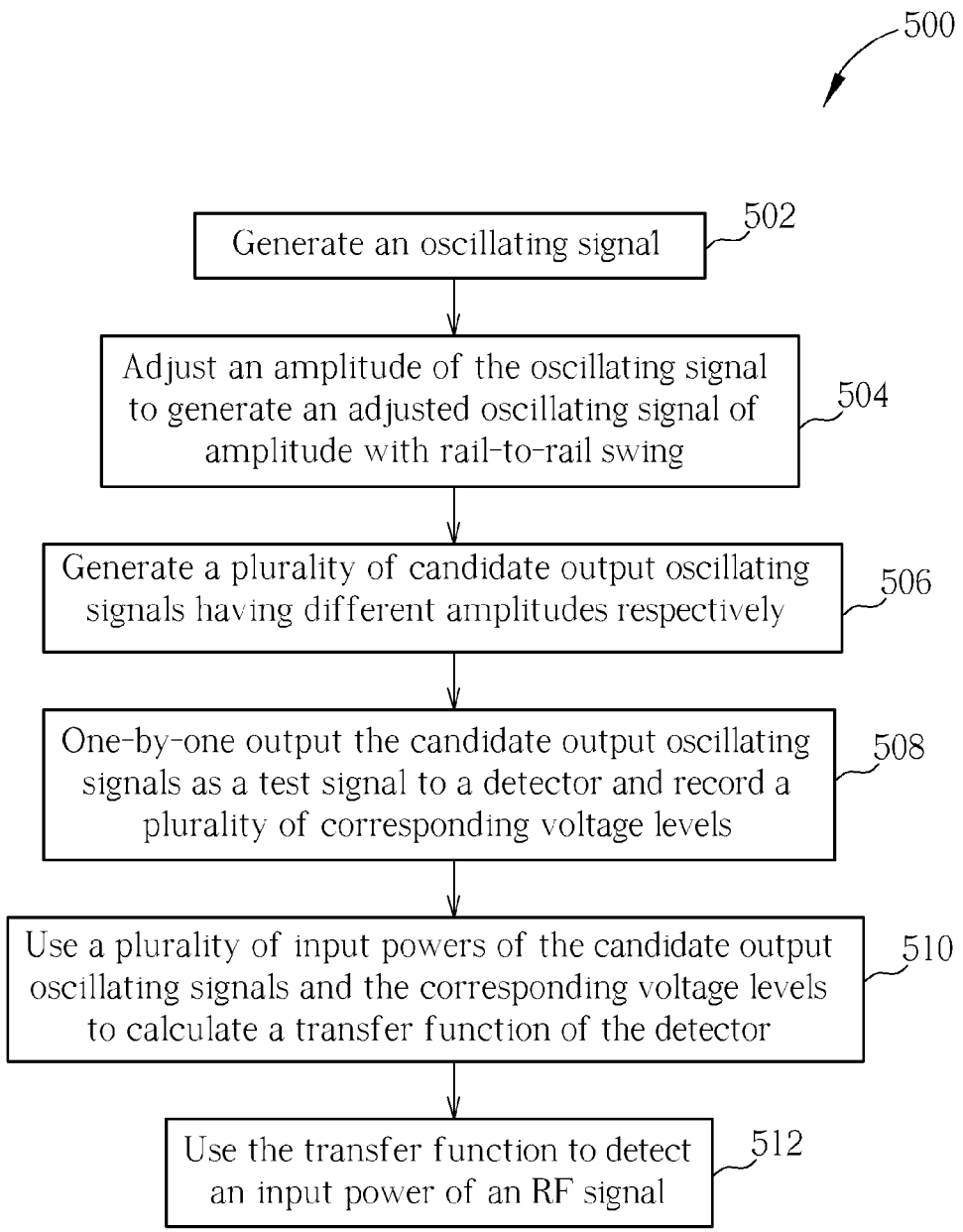
FIG. 5 is a flowchart illustrating a power detecting method according to an embodiment of the present invention.

FIG. 5 is a flowchart illustrating a power detecting method 500 according to an embodiment of the present invention. For brevity, the power detecting method 500 may by performed by the above-mentioned detecting circuit 200. Provided that substantially the same result is achieved, the steps of the flowchart shown in FIG. 5 need not be in the exact order shown and need not be contiguous, that is, other steps can be intermediate. The power detecting method 500 comprises the steps:

Step 502: Generate the oscillating signal Sosc;

Step 504: Adjust the amplitude A1 of the oscillating signal Sosc to generate the adjusted oscillating signal Sao having amplitude A4 with rail-to-rail swing;

Step 506: Generate the candidate output oscillating signals Sco1-Sco4 having different amplitudes respectively;

Step 508: Output the candidate output oscillating signals Sco1-Sco4 one-by-one as the test signal St to the detector 204 and record the corresponding voltage levels Vout1-Vout4;

Step 510: Use the input power levels Vin1-Vin4 of the candidate output oscillating signals Sco1-Sco4 and the corresponding voltage levels Vout1-Vout4 to calculate the transfer function of the detector 204;

Step 512: Use the transfer function to detect the input power of the RF signal Srf.

When the detecting circuit 200 is powered on, for example, the detecting circuit 200 performs the steps 502-510 to obtain the real transfer function of the detector 204. Then, the detector 204 uses the transfer function to detect the input power of the RF signal Srf (Step 512). As mentioned above, the transfer function includes the factors of process variation, temperature drift, and circuit mismatch effect of the detector 204, therefore the processing circuit 206 may accurately calculate the input power of the RF signal Srf according to the transfer function.

Briefly, by disposing the signal generator 202 and the detector 204 in the same chip, and using the signal generator 202 to inject a plurality of test tone signals at the predetermined power levels to the detector 204 to obtain the relationship between the voltage level Vout and the input power of the test signal St of the detecting circuit 200, the calibrated transfer function of the detector 204 can be obtained. In addition, by disposing the signal generator 202 and the detector 204 in the same chip, the cost of manufacturing the detecting circuit 200 can further be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal generator, comprising:
   an adjusting circuit, arranged to adjust a first amplitude of an oscillating signal to generate an adjusted oscillating signal; and
   a resistor ladder circuit, arranged to receive the adjusted oscillating signal to generate a plurality of candidate output oscillating signals having a plurality of different amplitudes respectively and output an output oscillating signal selected from the candidate output oscillating signals;
   wherein the adjusted oscillating signal is a square wave with rail-to-rail swing.

2. The signal generator of claim 1, wherein the adjusting circuit comprises:
   at least one amplifier, arranged to amplify the first amplitude of the oscillating signal to generate the adjusted oscillating signal with rail-to-rail swing.

3. The signal generator of claim 2, wherein the at least one amplifier includes a first amplifier and a second amplifier, the first amplifier has a first gain provided to amplify the first amplitude of the oscillating signal to generate an amplified oscillating signal having a second amplitude, the second amplifier has a second gain provided to amplify the second amplitude of the amplified oscillating signal to generate the adjusted oscillating signal with rail-to-rail swing, and the first gain is different from the second gain.

4. The signal generator of claim 1, wherein the resistor ladder circuit comprises:
   a voltage dividing circuit, arranged to divide the adjusted oscillating signal to generate the candidate output oscillating signals respectively; and
   a switching circuit, arranged to select one of the candidate output oscillating signals as the output oscillating signal.

5. A signal generator, comprising:
   an adjusting circuit, arranged to adjust a first amplitude of an oscillating signal to generate an adjusted oscillating signal; and
   a resistor ladder circuit, arranged to receive the adjusted oscillating signal to generate a plurality of candidate output oscillating signals having a plurality of different amplitudes respectively and output an output oscillating signal selected from the candidate output oscillating signals;
   wherein the adjusted oscillating signal is a square wave with constant amplitude.

6. The signal generator of claim 5, wherein the resistor ladder circuit comprises:
   a voltage dividing circuit, arranged to divide the adjusted oscillating signal to generate the candidate output oscillating signals respectively; and
   a switching circuit, arranged to select one of the candidate output oscillating signals as the output oscillating signal.

7. A signal generator, comprising:
an adjusting circuit, arranged to adjust a first amplitude of an oscillating signal to generate an adjusted oscillating signal; and
a resistor ladder circuit, arranged to receive the adjusted oscillating signal to generate a plurality of candidate output oscillating signals having a plurality of different amplitudes respectively and output an output oscillating signal selected from the candidate output oscillating signals;
wherein the adjusting circuit comprises:
at least one inverter, arranged to invert the oscillating signal to generate the adjusted oscillating signal with rail-to-rail swing.

8. The signal generator of claim 7, wherein the at least one inverter includes a first inverter and a second inverter, the first inverter has a first driving capability to invert the oscillating signal to generate an inverted oscillating signal having a second amplitude, the second inverter has a second driving capability to invert the inverted oscillating signal to generate the adjusted oscillating signal with rail-to-rail swing, and the first driving capability is different from the second driving capability.

9. The signal generator of claim 8, wherein a size of the first inverter is different from a size of the second inverter.

10. The signal generator of claim 7, wherein the resistor ladder circuit comprises:
a voltage dividing circuit, arranged to divide the adjusted oscillating signal to generate the candidate output oscillating signals respectively; and
a switching circuit, arranged to select one of the candidate output oscillating signals as the output oscillating signal.

11. A signal generator, being used in a wide-band peak detector, comprising:
an adjusting circuit, arranged to adjust a first amplitude of an oscillating signal to generate an adjusted oscillating signal; and
a resistor ladder circuit, arranged to receive the adjusted oscillating signal to generate a plurality of candidate output oscillating signals having a plurality of different amplitudes respectively and output an output oscillating signal selected from the candidate output oscillating signals;
wherein the output oscillating signal is used as a test signal for the wide-band peak detector.

12. The signal generator of claim 11, wherein the adjusted oscillating signal is a square wave with constant amplitude.

13. The signal generator of claim 11, wherein the adjusted oscillating signal is a square wave with rail-to-rail swing.

14. The signal generator of claim 11, wherein the adjusting circuit comprises:
at least one amplifier, arranged to amplify the first amplitude of the oscillating signal to generate the adjusted oscillating signal with rail-to-rail swing.

15. The signal generator of claim 14, wherein the at least one amplifier includes a first amplifier and a second amplifier, the first amplifier has a first gain provided to amplify the first amplitude of the oscillating signal to generate an amplified oscillating signal having a second amplitude, the second amplifier has a second gain provided to amplify the second amplitude of the amplified oscillating signal to generate the adjusted oscillating signal with rail-to-rail swing, and the first gain is different from the second gain.

16. The signal generator of claim 11, wherein the resistor ladder circuit comprises:
a voltage dividing circuit, arranged to divide the adjusted oscillating signal to generate the candidate output oscillating signals respectively; and
a switching circuit, arranged to select one of the candidate output oscillating signals as the output oscillating signal.

* * * * *